United States Patent
Zheng et al.

(10) Patent No.: US 8,275,102 B2
(45) Date of Patent: Sep. 25, 2012

(54) CALL ROUTING AND PRIORITIZATION BASED ON LOCATION CONTEXT

(75) Inventors: Yu Zheng, Beijing (CN); Sharad Agarwal, Seattle, WA (US); Alex Hehmeyer, Bellevue, WA (US); Noor-E-Gagan Singh, Redmond, WA (US); Venky Venkateshaiah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 12/481,644

(22) Filed: Jun. 10, 2009

(65) Prior Publication Data

US 2010/0316205 A1    Dec. 16, 2010

(51) Int. Cl.
*H04M 1/56* (2006.01)
(52) U.S. Cl. ............... 379/142.05; 379/142.06; 370/352
(58) Field of Classification Search ............ 379/142.05, 379/142.06, 142.1, 142.11
See application file for complete search history.

(56) References Cited

U.S. PATENT DOCUMENTS

| | | | |
|---|---|---|---|
| 6,185,426 B1 | 2/2001 | Alperovich et al. | |
| 6,353,664 B1 | 3/2002 | Cannon et al. | |
| 7,076,041 B2 * | 7/2006 | Brown et al. | 379/142.05 |
| 7,269,413 B2 | 9/2007 | Kraft | |
| 2003/0156696 A1 * | 8/2003 | Brown et al. | 379/196 |
| 2004/0203924 A1 | 10/2004 | Chen | |
| 2005/0195802 A1 | 9/2005 | Klein et al. | |
| 2005/0272448 A1 | 12/2005 | Tran et al. | |
| 2006/0035647 A1 | 2/2006 | Eisner et al. | |
| 2006/0105795 A1 * | 5/2006 | Cermak et al. | 455/518 |
| 2008/0293427 A1 | 11/2008 | Quon et al. | |
| 2009/0210802 A1 * | 8/2009 | Hawkins et al. | 715/753 |
| 2009/0279681 A1 * | 11/2009 | McKee et al. | 379/201.02 |
| 2010/0215157 A1 * | 8/2010 | Narayan et al. | 379/88.19 |
| 2010/0273460 A1 * | 10/2010 | Dorbie | 455/414.1 |
| 2011/0131287 A1 * | 6/2011 | Skakkebaek et al. | 709/206 |

OTHER PUBLICATIONS

Devlic, Alisa, "Extending CPL with Context Ontology", Retrieved at <<http://www.appearnetworks.com/IMG/pdf/MIDAS_Scientific_Publication_2.pdf>>, IMAC Workshop 2006, pp. 5.

* cited by examiner

*Primary Examiner* — Creighton Smith
(74) *Attorney, Agent, or Firm* — Turk IP Law, LLC

(57) ABSTRACT

Called parties in an enhanced communication system are provided location information associated with a calling party to help them determine whether they should accept the call. Alternatively, automatic call routing may be performed based on location context information associated with the calling party such as whether the caller is calling from a regular location association with him/her or an extra-ordinary location.

20 Claims, 7 Drawing Sheets

CALL ROUTING AND PRIORITIZATION BASED ON LOCATION CONTEXT

BACKGROUND

Modern telecommunication services include a number of supplementary features and services in addition to basic facilitation of communication. For example, caller ID is a well known feature that notifies called parties about an identity of the calling party (a phone number, a name, etc.). While this feature is useful in enabling the called party to make a decision whether to accept, reject, or forward an incoming call, it provides limited information. For example, if the caller ID indicates someone calling from their mobile phone, that person could be anywhere (nearby, very far away, etc.).

Another aspect of constantly evolving, modern telecommunication technologies is the breadth of services. While the audio communication (phone) was the norm until recently, multimodal communications including text messaging, email, audio/video communication, data sharing, and many more are becoming a standard feature of widely available telecommunication services with a wide variety of devices accommodating those services. Cellular telephones are an illustrative example. The services provided through a cellular phone such as video streaming, image acquisition and transfer, music distribution, financial transactions, and many others are examples of activities that would have been impossible through conventional phone technologies.

With the broad range of available communication modes, the decision making process for accepting, rejecting, or forwarding incoming communication session requests is also becoming more complicated. Providing information beyond the identity of the calling party may enable called parties to make better decisions—manual or automatic—regarding the requested call.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing subscribers of enhanced communication systems location context information associated with received call requests. The call request may alert the called party that a caller is calling from an extra-ordinary location such as a hospital and the call may be important for that reason. According to some embodiments, automatic routing may be performed based on inference(s) based on location context information associated with the calling party.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
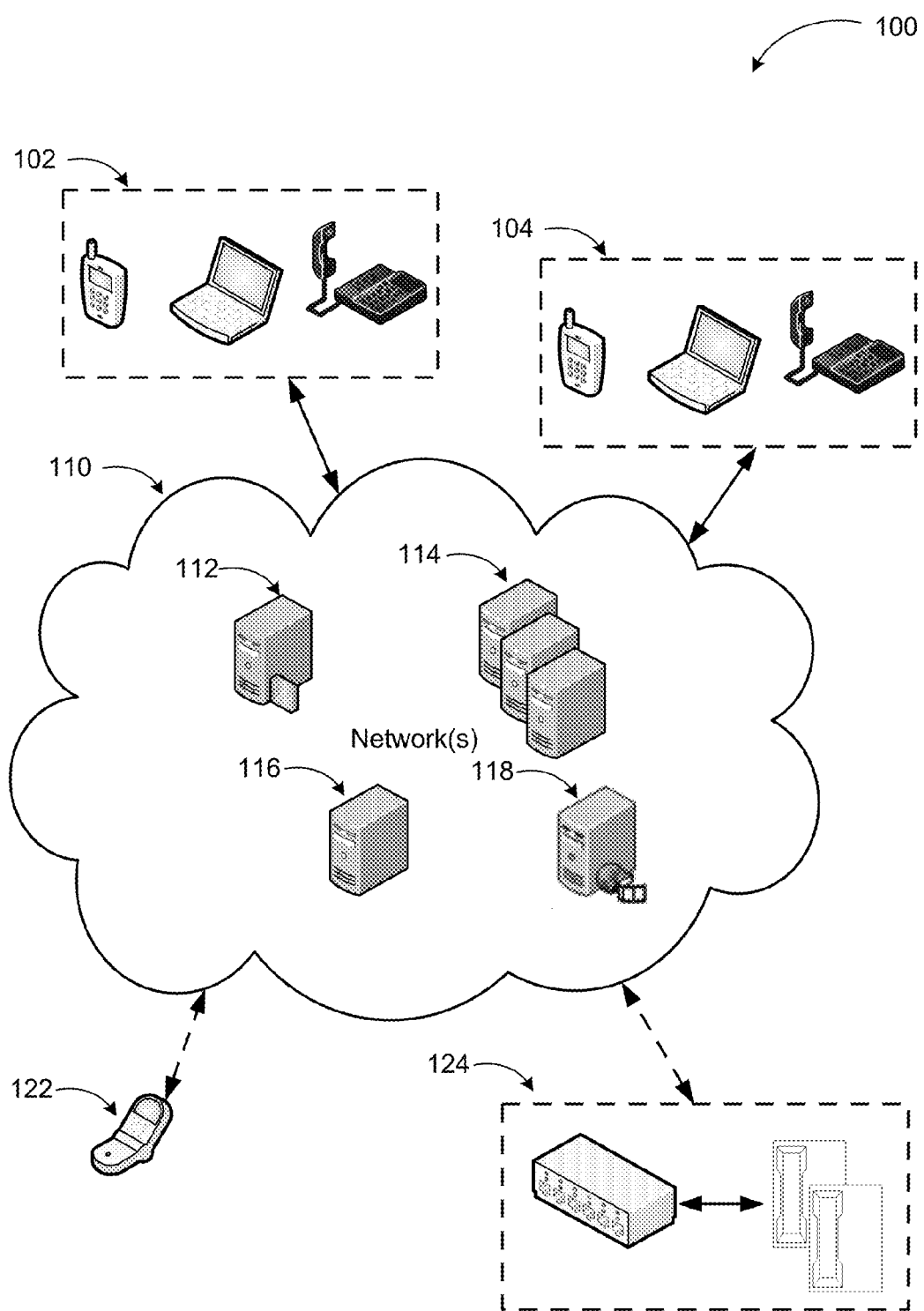
FIG. 1 is a diagram illustrating an example unified communications system.

As briefly described above, location context information may be provided to subscribers of an enhanced communication system to enable them to make more informed decisions on accepting an incoming call. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing presence and location based entity presentation. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below. The term "call" as used herein is not limited to audio communication based phone calls. The term is used in a broader sense to encompass various modern communication modalities such as text messaging, video communications, data sharing, application sharing, conferencing, and comparable ones. Accordingly, the terms "called party" and "calling party" are not limited to subscribers of a conventional phone system, but an enhanced communication system as described in more detail below.

Referring to FIG. 1, diagram 100 of an example unified communications system is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, subscribers may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Presence functionality enables the system to route calls to a subscriber and to anyone of the client devices assigned to the subscriber based on default and/or subscriber set policies. For example, if the subscriber is not available through a regular phone, the call may be forwarded to the subscriber's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other subscribers in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, subscribers may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

The SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

Because end devices in a UC system according to embodiments can provide and receive a variety of information about their status (hardware and/or software) and a subscriber's status, a number of additional features may be incorporated into communication capabilities. For example, a subscriber's location, availability, their preferences, and similar information may be exchanged prior to or during communication. The end devices in such a system may also receive information from other sources like a GPS server or a cellular system device including location information for other subscribers. Thus, a subscriber may receive location context information along with an incoming communication session request and decide whether to accept or reject the request based on the information. Alternatively, the system may route incoming communication requests based on inferences made from location context information.

While the example system in FIG. 1 has been described with specific components such as mediation server, A/V server, and similar devices, embodiments are not limited to these components or system configurations and can be implemented with other system configuration employing fewer or additional components. Functionality of systems enabling alerting of a user about nearby contacts based on location and context may also be distributed among the components of the systems differently depending on component capabilities and system configurations.

Figure 2:
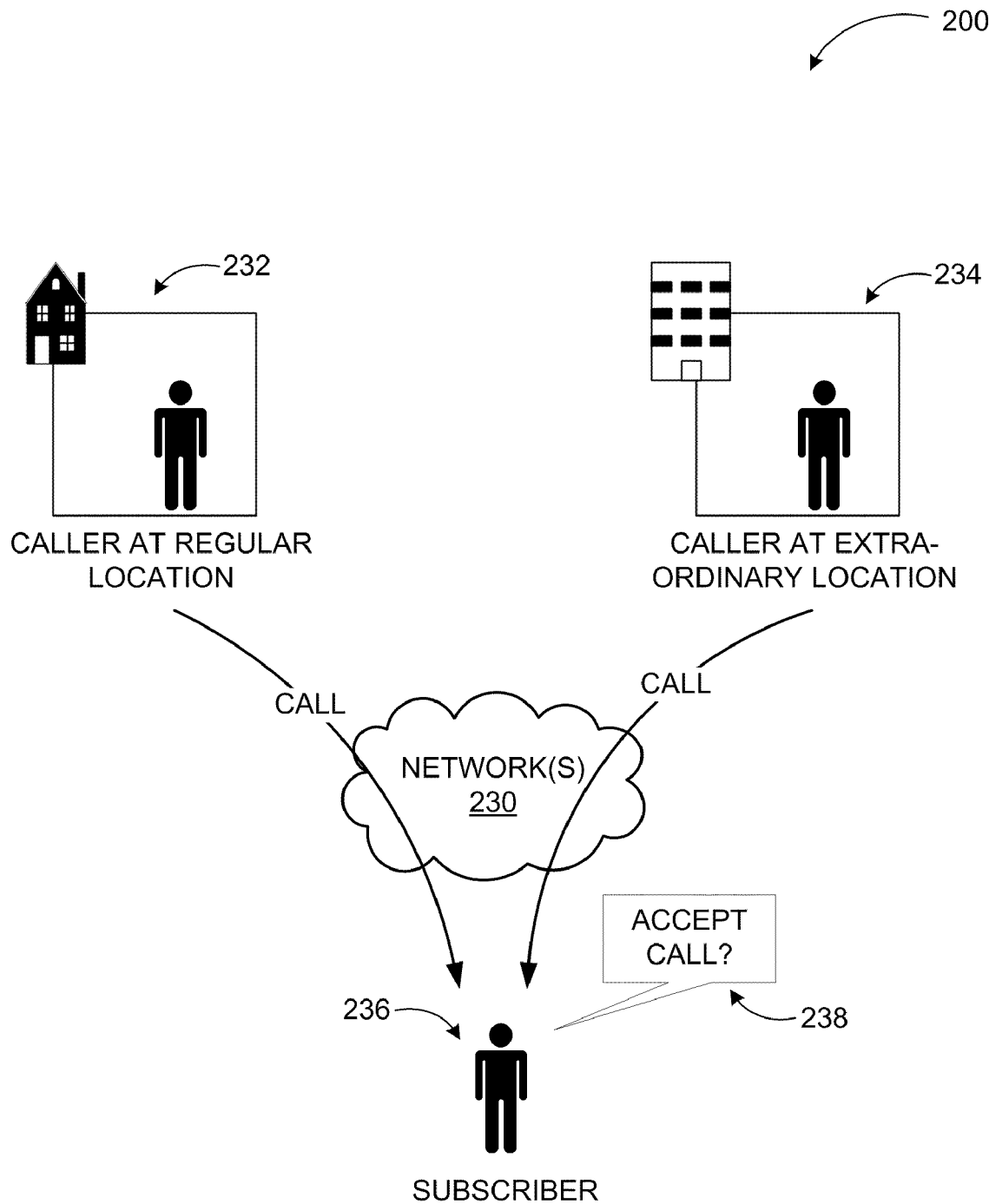
FIG. 2 is a conceptual diagram illustrating the decision making process for accepting a call based on location context information associated with a calling party according to embodiments.

FIG. 2 includes conceptual diagram 200 illustrating the decision making process for accepting a call based on location context information associated with a calling party according to embodiments. In conventional communication systems, a called party may know the identity of the caller based on caller ID, however, they typically do not know the reason why they are being called. For example, a subscriber may be in a public place and receive a call from an acquaintance, who may be nearby and calling the subscriber to let them know. If the subscriber decides not to accept the call, it may be embarrassing for the subscriber. According to a more serious scenario, a family member may call on their cellular phone from a hospital to notify about an emergency. If the called subscriber is busy at the moment, they may decide not to accept the call. However, if the subscriber can see the call is from a hospital, they realize this may be an emergency call and accept it.

Generally, it is difficult to know the exact reason why someone is calling because only the caller knows it and making them type that into a mobile device before they call is too burdensome. However, in many cases, the location of the caller can be determined and that may provide sufficient context. As discussed in the above example, the caller being at a hospital—unless the caller is a surgeon/nurse/doctor—may provide sufficient context to always prioritize this call.

Furthermore, a combination of the location of the caller and the called party provides even more context information. If the caller is, for example, 10 ft away from the called party or in the same building, then the called party should probably answer the call, since the caller can see the called party and notice that he/she looked at their phone and decided to ignore the call and be offended.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, a variety of communication modes such as voice communication, video communication, instant messaging, electronic mail, data sharing, application sharing, whiteboard sharing, and similar modes, may be available depending on the capabilities of each device and applications available on each device. Thus, in a system according to embodiments, a subscriber may also choose a modality of the incoming communication request based on the location context information. For example, a subscriber may receive a request for communication from a colleague currently at a hospital, but the subscriber may be in the middle of a meeting. Recognizing the request may be associated with an emergency situation, the subscriber may respond with a text message instead of accepting an audio communication session and escalate to audio later, if necessary.

Subscriber 236 shown in diagram 236 may receive a call from a caller at a location that may be inferred as a regular location (232) for that caller over network(s) 230. For example, the caller may be a colleague calling from their place of business or home. In that case, the decision process 238 for subscriber 236 may not prioritize the call, if subscriber 236 is busy.

On the other hand, a call received from the same caller at an extra-ordinary location (234) such as a hospital, a police station, and the like, may result in the subscriber 236 prioritizing the call and accepting it despite being busy. As discussed above, the relative locations of the caller and the subscriber may also be important for the decision process (e.g. the caller and the called party being in the vicinity of each other). Thus, location information for both the calling party and the subscriber 236 are needed for any location context based inference.

The location of the subscriber and caller(s) may be determined in a variety of ways. The location may be determined from Global Positioning Service (GPS) information, cellular network information, and information obtained from an active connection of the contact to a non-cellular network. For example, the subscriber's communication application may receive location information for the subscriber and for the caller from a separate source like a GPS server. Alternatively, the location information for either party (or both) may be published as part of their presence information, and the communication application may utilize the presence information received directly from the caller's communication application or a presence server to make an inference based on the location context.

Another aspect of determining location context information is the identity of the caller. While this may be easy for people known to the subscriber, more information may be needed for an unknown party or in case of automatic routing. Such information may include the identity of the caller, their title/position/organization/address, and similar data. Thus, location context information combines location information for a caller or called party with their attribute(s) such as their identity. For example, a customer service agent for a road service company may prioritize a call from a customer calling from their car over a call coming from the customer's home.

According to further embodiments, the calling party may be provided with location and context information in order to make the decision whether to place the call or not. For example, the communication application for the calling party may determined that the called party is busy (e.g. in a meeting). However, the calling party's location based context indicated an exceptional situation such as being in a hospital. So, the communication application places the call anyway, despite the called party's current status. Similar automatic decisions may be made based on location and context information associated with calling and called parties. According to another example scenario, a called party's status may be away from the office and present callers the choice of leaving a voicemail. A calling party's communication application may determine based on location information that both parties are at the same meeting and place the call to the called party's mobile device.

Figure 3:
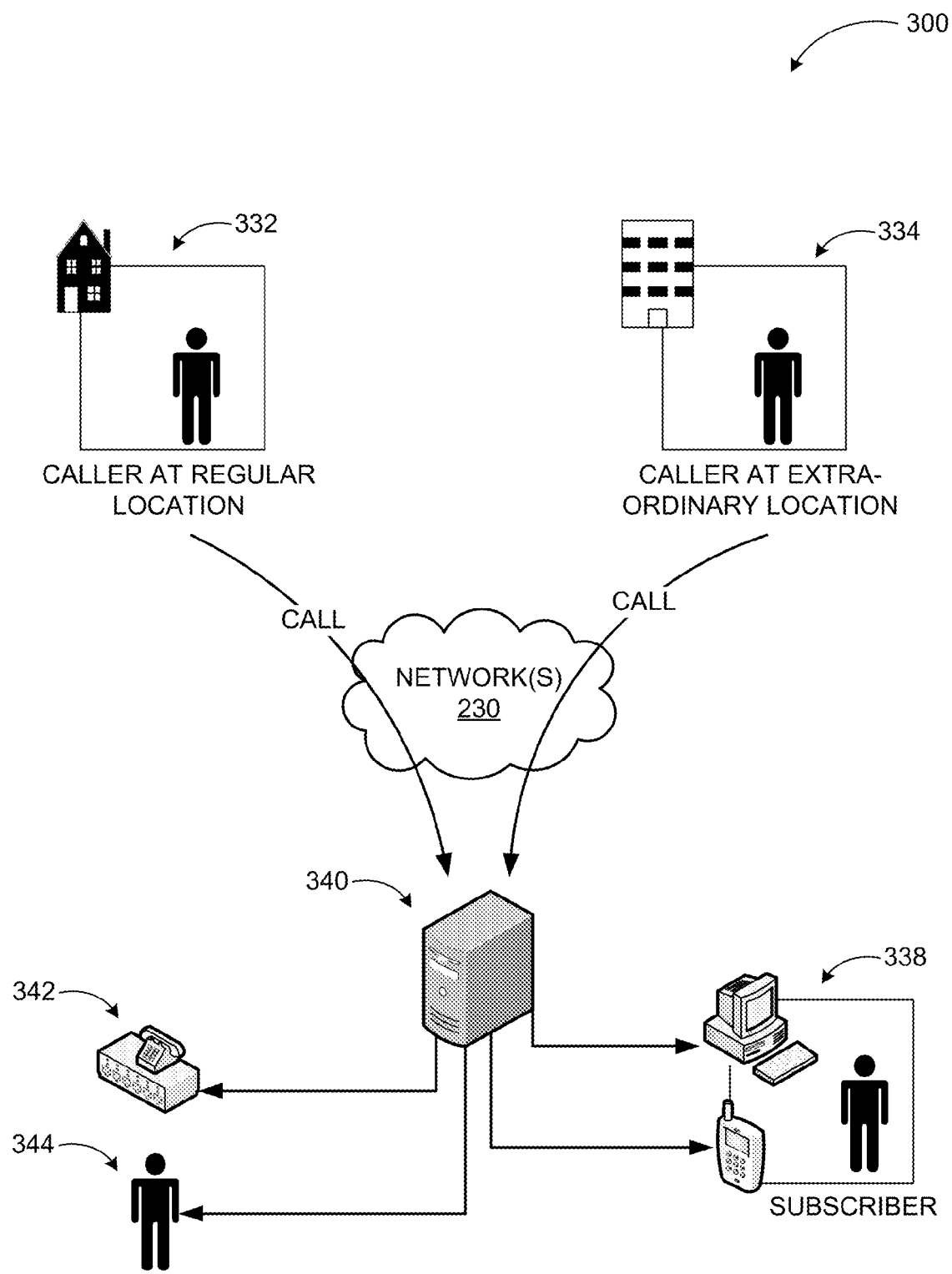
FIG. 3 is a conceptual diagram illustrating the decision making process for automatically routing a call based on location context information associated with a calling party according to embodiments.

FIG. 3 is a conceptual diagram illustrating the decision making process for automatically routing a call based on location context information associated with a calling party according to embodiments. According to one embodiment, call routing may be performed based on location context information. A communication management server 340 may manage a subscriber's incoming calls based on default or subscriber defined rules.

Incoming calls may be routed to a voicemail system 342 or a delegate 344 of the subscriber when the subscriber is unable or does not wish to accept the call. Server 340 may make an inference as described above depending on whether call is from a regular location 332 or an extra-ordinary location 334 and route accordingly. The relative vicinity of the caller and the subscriber may also be taken into consideration. The routing rules may be modified based on subscriber provided exceptions (e.g. forward my calls to voicemail unless they are from a hospital) or automatically by the server. Thus, the server may execute an intelligent algorithm that may determine the location context of the incoming call and prioritize based on that.

According to another embodiment, the subscriber may use multiple end devices, and the incoming call may be routed to a proper end device based on the location context information. For example, the subscriber may have their desktop communication application and a mobile application active at the same time. If a priority call comes in, the system may determine the subscriber may be away from their desk momentarily, but may have their mobile device with them.

Thus, the system may send the incoming call alert to the mobile device if the call is a priority call.

Figure 4:
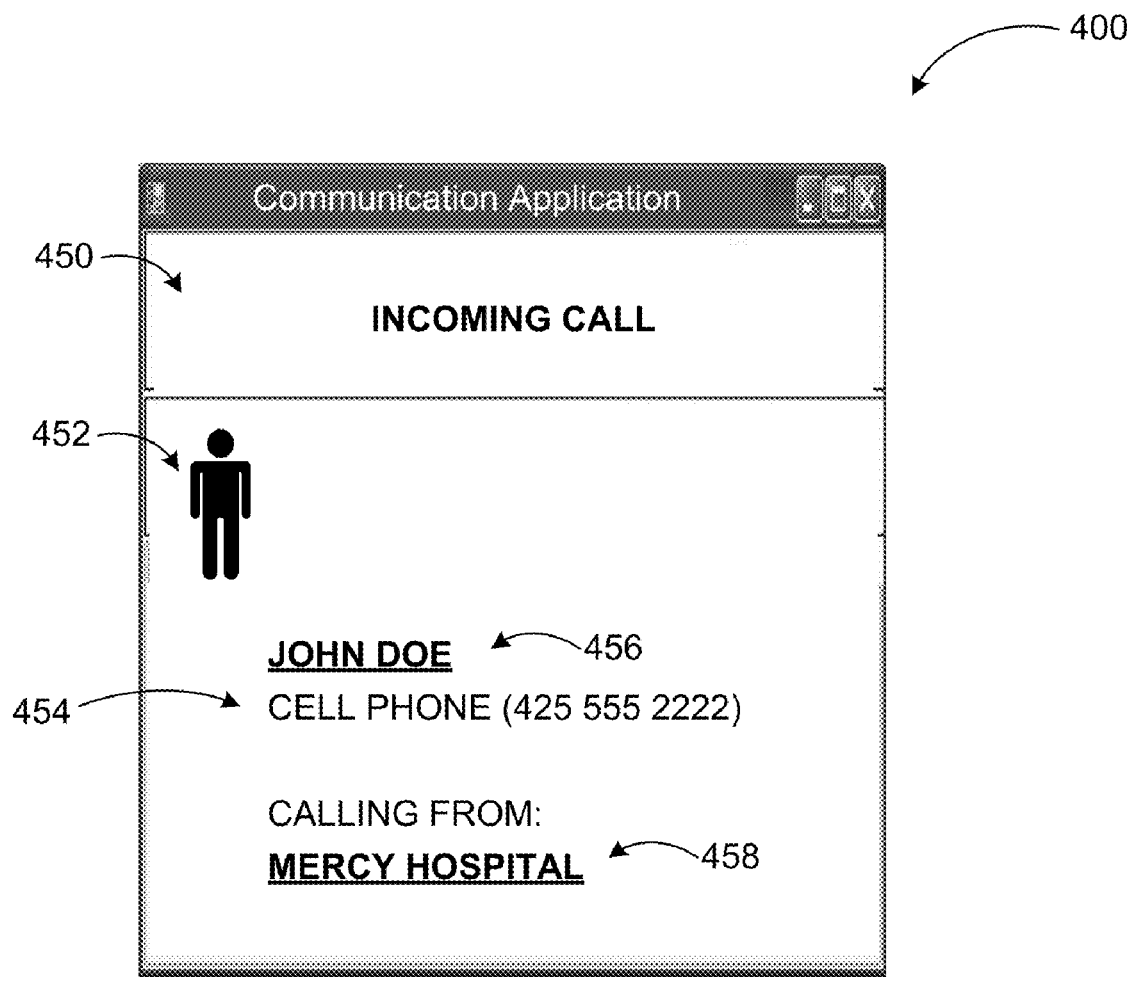
FIG. 4 is a screenshot of an example communication application user interface enabling subscribers to accept/reject/forward an incoming call based on location context information according to embodiments.

FIG. 4 is a screenshot of an example communication application user interface 400 enabling subscribers to accept/reject/forward an incoming call based on location context information according to embodiments. While a user interface for such an application may take any form and include a variety of elements, example ones are shown in FIG. 4 to illustrate aspects of the present disclosure. As shown in the example user interface 400, the subscriber may be alerted to an incoming call (450) in visual and audible form along with additional information such as a picture of the caller 452.

The additional information may include a name 456 and number 454 of the caller. In case of multimodal communications and communication systems using other forms of identification, different identifiers may also be used such as a SIP identifier of the caller, an email address of the caller, etc.

The location context information 456 may simply present a location of the caller. Alternatively, an inference made from the location context information such as "Extra-ordinary Location", "This May Be An Emergency Call", "The Caller Is In Vicinity", etc., may also be presented to the called party. Other information such as an address, a contact number, an email address, an organizational structure, an expertise, an availability status, a schedule, and a membership group of the calling party may also be provided by the user interface 400.

According to other embodiments, the inference based on location context may be made by employing a branch-and-bound algorithm, a progressive improvement algorithm, and a heuristic algorithm. The user interface may display some of the information as actionable items (e.g. links) employing a graphical shape-based scheme, an icon scheme, a color scheme, or a text-formatting scheme. While the example user interface 400 is for a communication application, other functionality may also be provided (such as printing information associated with a contact) by providing a link to relevant application(s).

While specific computing devices and communication related tasks have been described above, these are for illustration purposes only and do not constitute a limitation on embodiments. Many other hardware environments and communication related tasks may be implemented using the principles described herein.

Figure 5:
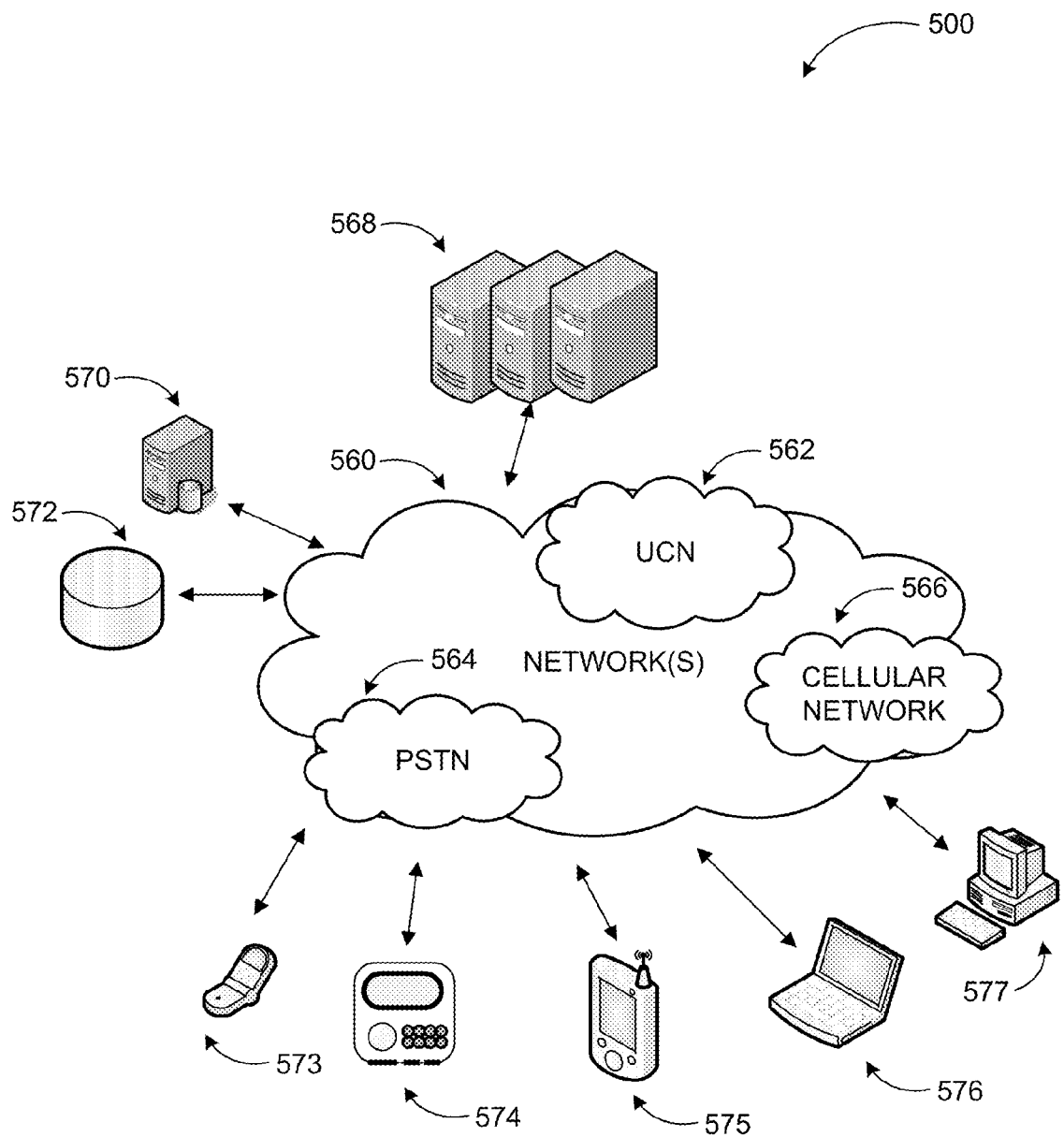
FIG. 5 is a networked environment, where a system according to embodiments may be implemented.

FIG. 5 is an example networked environment, where embodiments may be implemented. A platform providing enhanced communication services with above discussed features may be implemented via software executed over one or more servers 568 such as a hosted service. The platform may communicate with consuming applications on individual computing devices such as a cellular phone 573, smart automobile console 574, a handheld computer 575, a laptop computer 576, and desktop computer 577 ('client devices') through network(s) 560.

As discussed previously, client devices 573-577 are used to facilitate communications through a variety of modes between subscribers of the enhanced communication service. A communication application executed in one of the client devices or by one of the server 568 may determine location context information associated with a calling party in response to receiving a call request and automatically route the call or provide the location context information to the called party for them to make a decision regarding whether they accept, reject, or forward the call. Information associated with subscribers and facilitating communications may be stored in one or more data stores (e.g. data store 572), which may be managed by any one of the servers 568 or by database server 570.

Network(s) 560 may comprise any topology of servers, clients, Internet service providers, and communication media. A system according to embodiments may have a static or dynamic topology. Network(s) 560 may include a secure network such as an enterprise network, an unsecure network such as a wireless open network, or the Internet. Network(s) 560 may also comprise a plurality of distinct networks such as UC network 562, PSTN 564, and cellular network 566. Network(s) 560 provides communication between the nodes described herein. By way of example, and not limitation, network(s) 560 may include wireless media such as acoustic, RF, infrared and other wireless media.

Many other configurations of computing devices, applications, data sources, and data distribution systems may be employed to implement a system for using called party and calling party location information to infer context and enable automatic routing or manual acceptance of an incoming call. Furthermore, the networked environments discussed in FIG. 5 are for illustration purposes only. Embodiments are not limited to the example applications, modules, or processes.

Figure 6:
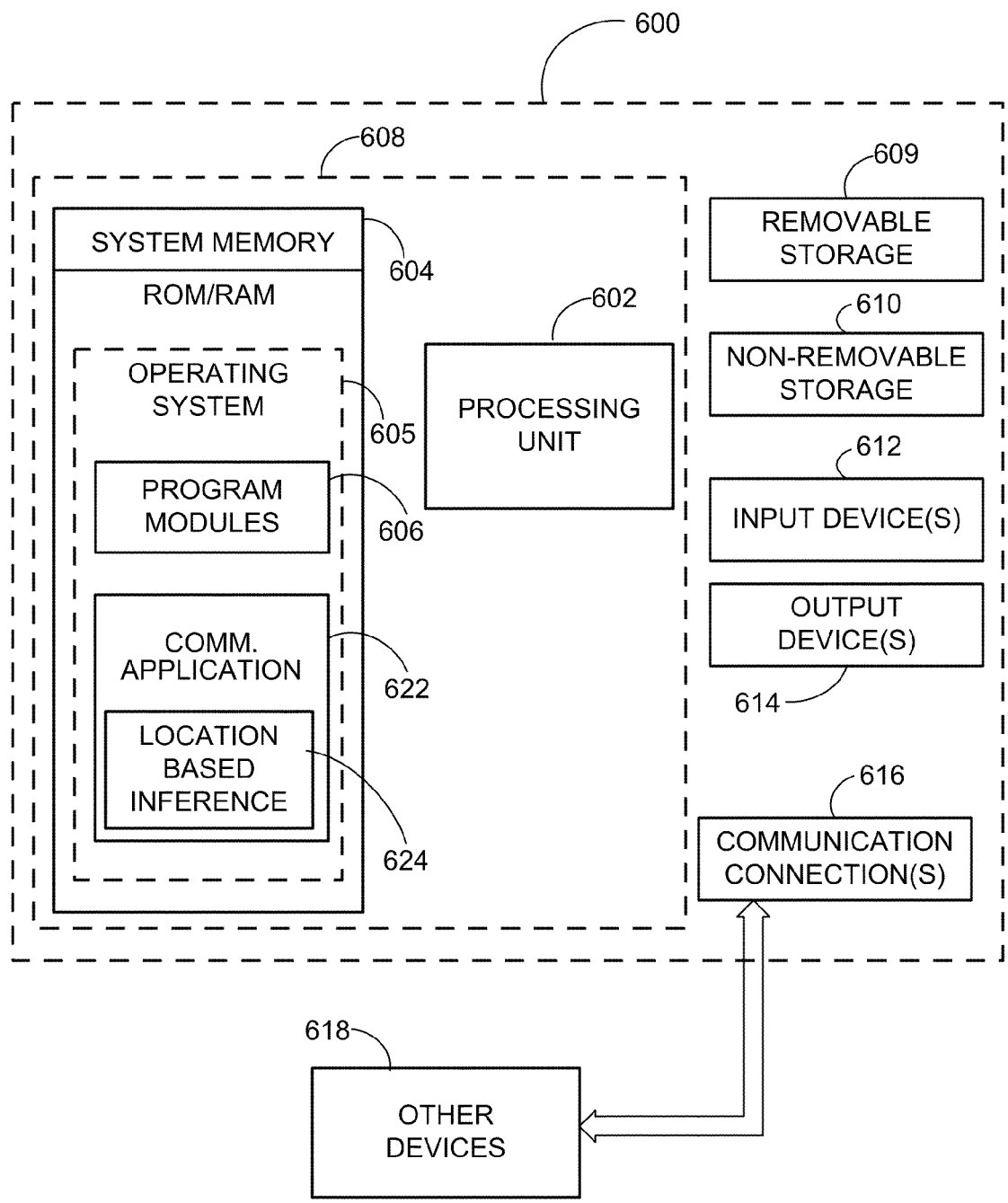
FIG. 6 is a block diagram of an example computing operating environment, where a communication application according to embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computer 600. In a basic configuration, computer 600 may include at least one processing unit 602 and system memory 604. Computer 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and location based inference module 624.

Communication application 622 and location based inference module 624 may be separate applications or integral modules of a hosted service that provides communication services to client applications/devices. Location based inference module 624 may analyze location information for a calling party and the called party using computing device 600, and determine location context information to be provided to the called party or to be used in automatic routing of the incoming call. This basic configuration is illustrated in FIG. 6 by those components within dashed line 608.

Computer 600 may have additional features or functionality. For example, the computer 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 600. Any such computer readable storage media may be part of computer 600. Computer 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computer 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, GPS satellites providing GPS data, cellular towers providing external data and/or positioning data, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
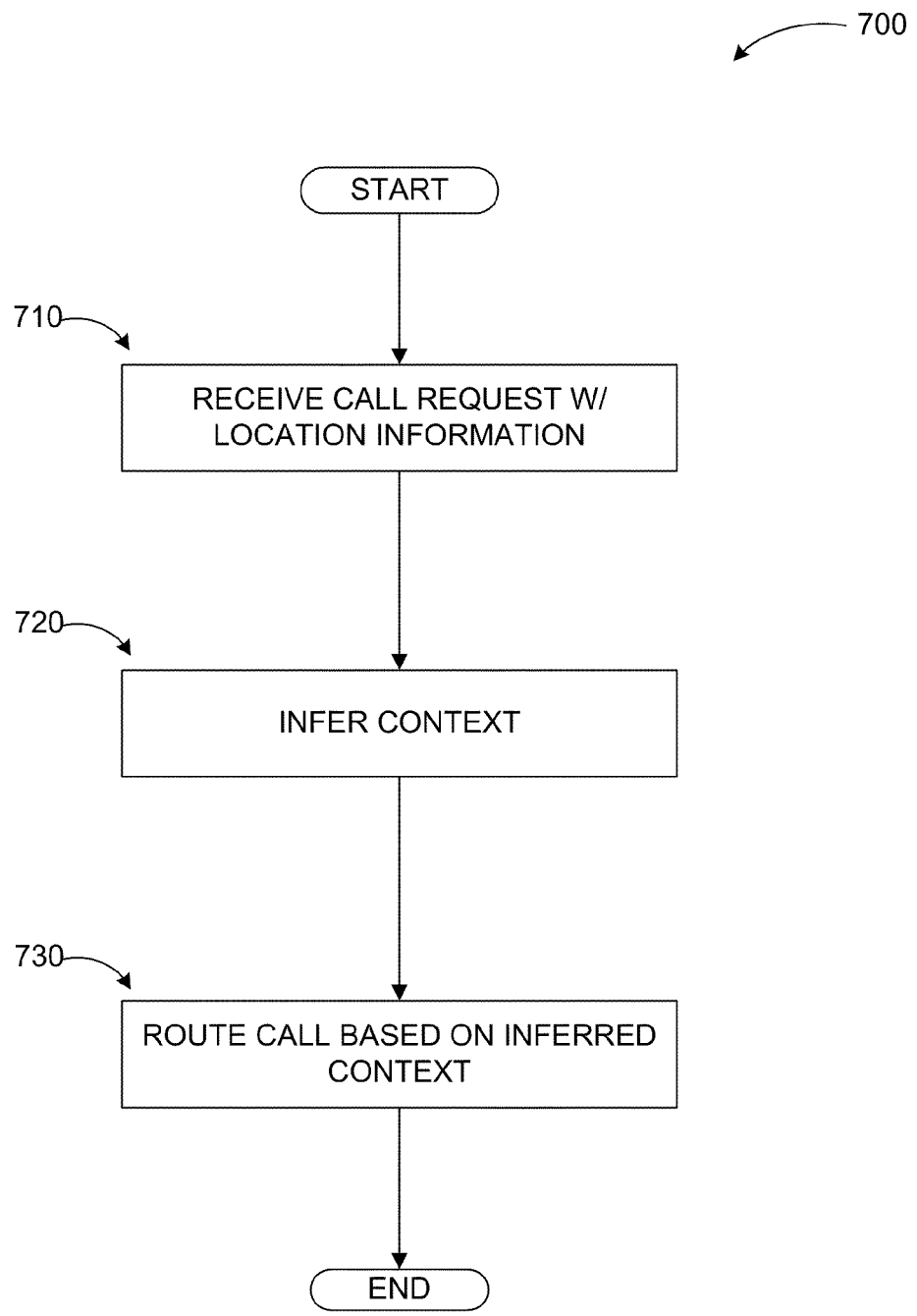
FIG. 7 illustrates a logic flow diagram for a process of employing location context information in facilitating communications.

FIG. 7 illustrates a logic flow diagram for process 700 of employing location context information in facilitating communications. Process 700 may be implemented as part of a unified communication system communicator application such as the one described above.

Process 700 begins with operation 710, where an incoming communication request ('call') is received along with location context information. The location context information may be based on geographic location information for the calling party and called party received from a source like a GPS server and additional information associated with the calling party such as their regular location, their attribute (e.g. family member, colleague, etc.)

At operation 720, an inference is made about the location context determining whether the location of the calling party is a regular location or an extra-ordinary location such as a family member calling from a hospital or an acquaintance calling from a nearby location. At operation 730, the call is routed based on the inferred location context. Alternatively, the called party may be provided the location context information to decide whether to accept or reject the call.

The operations included in process 700 are for illustration purposes. Providing location context information for incoming call requests may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for location context based routing and prioritization of communication requests, the method comprising:
   receiving a communication session request for a subscriber of an enhanced communication system from a calling party via an access server;
   determining a location and an identity, including one or more of a telephone number and a session initiation protocol (SIP) uniform resource identifier (URI), of the calling party;
   determining a location, availability, status, and preferences of the subscriber;
   determining an attribute of the calling party;
   inferring location context information based on the location and identity of the calling party, the attribute of the calling party, and the location of the subscriber;
   providing the location context information to at least one of: the subscriber and the calling party via the access server; and
   prioritizing the communication session request based on the inferred location context information of the caller and the location of the subscriber via a communication management server.

2. The method of claim 1, further comprising:
   automatically routing the incoming communication session request based on the location context information via the access server.

3. The method of claim 2, wherein the requested communication session request is prioritized based on one of: whether the calling party is at an extra-ordinary location as determined by the location context information and whether the calling party is within a vicinity of the subscriber as determined by the location context information.

4. The method of claim 1, further comprising:
   providing a call routing selection to the calling party based on the location context information of the calling party and the location of the subscriber.

5. The method of claim 1, wherein the attribute of the calling party includes at least one from a set of: an identity, a title, a position, an organization, a membership in a group, and an address.

6. The method of claim 5, wherein the attribute of the calling party is determined based on information retrieved from at least one from a set of: an organizational directory, a subscriber directory, and a third party directory.

7. The method of claim 1, wherein the location of the subscriber and the location of the calling party are determined based on at least one from a set of: Global Positioning Service (GPS) information, cellular network information, and information obtained from an active connection a non-cellular network.

8. The method of claim 1, wherein the location of the subscriber, the location of the calling party, and the attribute of the calling party are determined based on presence information associated with the subscriber and the calling party, respectively.

9. The method of claim 8, wherein the presence information is received from one of: directly from the calling party and a presence server.

10. The method of claim 1, wherein the requested communication session includes at least one from a set of: a voice communication, a video communication, an instant messaging exchange, a text message exchange, an application sharing session, a data sharing session, and a whiteboard sharing session.

11. The method of claim 1, wherein the communication session is facilitated by at least from a set of: a smart phone, a laptop, a desktop computer, a handheld computer, and a smart automobile console executing a communication application.

12. An enhanced communication system for location context based routing and prioritization of incoming calls, the system comprising:
a server and a communication management framework, the server configured to execute the communication management framework and further configured to enable a communication management server to manage a call to a subscriber, wherein the communication management server is further configured to:
receive the call for the subscriber of the enhanced communication system from a caller via an access server;
determine a location and an attribute of the caller, the attribute of the caller including at least one from a set of: an identity, a title, a position, an organization, a membership in a group, and an address, wherein the identity includes one or more of a telephone number and a session initiation protocol (SIP) uniform resource identifier (URI);
determine a location, availability, status, and preferences of the subscriber;
infer location context information based on the location and the attribute of the caller and the location of the subscriber;
prioritize the call based on the inferred location context information of the caller and the location of the subscriber;
automatically route the call to the subscriber based on the location context information and the priority of the call via the access server; and
if the call is to be routed to the subscriber, provide the location context information to the subscriber via the access server; and
a client device associated with the subscriber configured to:
provide the location context information along with an incoming call alert to the subscriber, wherein the incoming call alert includes one or more of: a visual alert and an audio alert, along with additional caller information including at least one of: the name of the caller, the number of the caller, an SIP identifier of the caller, an email address of the caller, a username of the caller, and picture alert of the caller;
enable the subscriber to one of: accept, reject, hold, and forward the call based on the provided location context information; and
if the subscriber selects to accept the call, facilitate the call via the access server.

13. The system of claim 12, wherein the server is further configured to: provide a call routing selection to the caller based on the location context information of the caller and the location of the subscriber.

14. The system claim 12, wherein the incoming call is automatically routed based on at least one from a set of: a set of default rules, a set of subscriber defined rules, and a dynamic determination employing an intelligent algorithm to one of: a voicemail system, a delegate of the subscriber, and an end device associated with the subscriber.

15. The system of claim 14, wherein a plurality of end devices are associated with the subscriber, and wherein the incoming call is routed to one of the plurality of end devices based on the inferred location context information.

16. The system of claim 12, wherein the location context information is inferred by employing at least one from a set of: a branch-and-bound algorithm, a progressive improvement algorithm, and a heuristic algorithm.

17. A computer-readable memory device having instructions stored thereon for location context based routing and prioritization of incoming calls, the instructions comprising:
receiving a call for a subscriber of an enhanced communication system from a caller via an access server associated a perimeter network within the enhanced communication system and enabling connectivity between subscribers within the enhanced communication system;
determining a location and an attribute of the caller, the attribute of the caller including at least one from a set of: an identity, a title, a position, an organization, a membership in a group, and an address wherein the identity includes one or more of a telephone number and a session initiation protocol (SIP) uniform resource identifier (URI);
determining a location, availability, status, and preferences of the subscriber;
inferring location context information based on the location and the attribute of the caller and also based on one of: whether the caller is in a vicinity of the subscriber and whether the caller is at an extra-ordinary location;
prioritizing the call based on the inferred location context information of the caller and the location of the subscriber;
automatically routing the call based on the inferred location context information to one of: a voicemail system, a delegate of the subscriber, and an end device associated with the subscriber via the access server;
if the call is to be routed to the subscriber, providing a user interface for displaying the location context information to the subscriber along with an incoming call alert wherein the incoming call alert includes one or more of: a visual alert and an audio alert, along with additional caller information including at least one of: the name of the caller, the number of the caller, an SIP identifier of the caller, an email address of the caller, a username of the caller, and picture alert of the caller;
enabling the subscriber to one of: accept, reject, hold, and forward the call based on the provided location context information; and
if the subscriber selects to accept the call, facilitating the call via the access server to a preferred end device associated with the subscriber.

18. The computer-readable memory device of claim 17, wherein the user interface further provides additional information including at least one from a set of: an address, a contact number, an email address, an organizational structure, an expertise, an availability status, a schedule, a location, and a membership group associated with the caller.

19. The computer-readable memory device of claim 18, wherein the user interface displays the location context information and the additional information with actionable items employing at least one from a set of: a graphical shape based scheme, an icon scheme, and a text formatting scheme.

20. The computer-readable memory device of claim 17, wherein the user interface is configured to enable the subscriber to accept the incoming call employing one communication modality and later escalate to another communication modality based on the location context information.

* * * * *